United States Patent
Kokunishi et al.

[11] Patent Number: 6,041,425
[45] Date of Patent: Mar. 21, 2000

[54] ERROR RECOVERY METHOD AND APPARATUS IN A COMPUTER SYSTEM

[75] Inventors: Motohide Kokunishi, Hachiouji; Hiromu Kato, Yokohama; Tsutomu Ito, Kanagawa; Toshio Hirosawa, Machida, all of Japan

[73] Assignee: Hitachi, Ltd., Tokyo, Japan

[21] Appl. No.: 08/921,572

[22] Filed: Sep. 2, 1997

[30] Foreign Application Priority Data

Sep. 3, 1996 [JP] Japan .................................. 8-252487

[51] Int. Cl.$^7$ .................................................. G06F 11/277
[52] U.S. Cl. ............................................. 714/37; 709/101
[58] Field of Search ........................ 395/183.13, 183.15, 395/185.02, 183.21, 185.04, 572, 672, 670, 671; 371/25.1; 364/266.4

[56] References Cited

U.S. PATENT DOCUMENTS

| | | | |
|---|---|---|---|
| 4,333,144 | 6/1982 | Whiteside et al. | 364/200 |
| 5,465,354 | 11/1995 | Hirosawa et al. | 395/650 |
| 5,511,149 | 4/1996 | Hayano | 395/112 |
| 5,557,736 | 9/1996 | Hirosawa et al. | 395/182.02 |
| 5,758,053 | 5/1998 | Takeuchi et al. | 395/182.02 |
| 5,826,078 | 10/1998 | Funaki | 395/670 |

FOREIGN PATENT DOCUMENTS 3-144831 6/1991 Japan .
7-311691 11/1995 Japan .

OTHER PUBLICATIONS

Japanese Technical Journal (HAITAC 1995. 11 pp. 1–4).

*Primary Examiner*—Dieu-Minh T. Le
*Assistant Examiner*—Scott Baderman
*Attorney, Agent, or Firm*—Beall Law Offices

[57] ABSTRACT

An error recovery reduces the recovery time in finding out the JOB causing error in a computer system. An event generation unit is called at the beginning of the execution of a JOB, at the end of the execution of the JOB and at the close process of the file input-output process, by the JOB execution control unit. The JOB start event, end event, and close event are generated by the event generation unit. A file input/output count acquisition unit is called to generate a file input/output count for each JOB, by the JOB execution control unit. The monitoring process thereby generates the execution record comprising the end code, the start time, the end time, the execution time, the file input/output count, and the error flag for each JOB, based upon the above mentioned events. The monitoring process activates the error recovery support process when the error occurs. The error recovery support process compares the execution record with the standard record based upon the normal execution, checks for an abnormality of the input/output count, the execution time and the end code, stores the abnormal flag into the execution record, and sets the JOB generating the abnormality as the JOB causing error. The operator instructs to re-execute the JOB after the recovery and reallocation of the file.

44 Claims, 16 Drawing Sheets

| 200 | JOB NAME | JOB 1 | JOB 2 | ... |
|---|---|---|---|---|
| 210 | END CODE | | | |
| 220 | START TIME | | | |
| 230 | END TIME | | | |
| 240 | EXECUTION TIME | | | |
| 250 | INPUT/OUTPUT RECORD | | | |
| 260 | ABNORMAL FLAG | | | |

| 251 | FILE NAME | FILE a | FILE b | ... |
|---|---|---|---|---|
| 252 | INPUT COUNT | | | |
| 253 | OUTPUT COUNT | | | |

| 261 | INPUT/ OUTPUT COUNT BIT |
|---|---|
| 262 | EXECUTION TIME BIT |
| 263 | END CODE BIT |

| IDENTIFIER | JOB NAME |
|---|---|
| MJJO | JOB 1 |
| MJJO | JOB 2 |
| MJJO | JOB 3 |
| MJJO | JOB 4 |
| | |

FIG. 3B

| IDENTIFIER | JOB NAME | PRECEDING JOB NAME |
|---|---|---|
| MJWO | JOB 3 | JOB 1, JOB 2 |
| MJWO | JOB 4 | JOB 3 |
| | | |

| | | |
|---|---|---|
| 410 — JOB NO. | | 003 |
| 420 — JOB NAME | | |
| 430 — ARRANGEMENT POSITION | X | | 431
| | Y | | 432
| 440 — STATUS | | |
| 450 — PRECEDING JOB LIST | THE NUMBER OF JOB | 2 | 451
| | JOB NO. 1 | 001 |
| | JOB NO. 2 | 002 | 452
| | | |
| 460 — THE FOLLOWING JOB LIST | THE NUMBER OF JOB | 1 | 461
| | JOB NO. 1 | 004 | 462
| | | |

| JOB NAME | JOB A | JOB B | JOB C | JOB D |
|---|---|---|---|---|
| END CODE | 4 | 4 | 0 | 16 |
| START TIME | 10:00 | 10:00 | 10:10 | 10:15 |
| END TIME | 10:10 | 10:05 | 10:15 | 10:20 |
| EXECUTION TIME | 600 SEC. | 300 SEC. | 300 SEC. | 300 SEC. |
| INPUT/OUTPUT RECORD | | | | |
| ABNORMAL FLAG | 000 | 000 | 000 | 000 |

*FIG. 12A*

JOB A  1202

| FILE NAME | FILE a |
|---|---|
| INPUT COUNT | |
| OUTPUT COUNT | 100 |

*FIG. 12B*

JOB B  1203

| FILE NAME | FILE b1 | FILE b2 |
|---|---|---|
| INPUT COUNT | | |
| OUTPUT COUNT | 100 | 10 |

*FIG. 12C*

JOB C 1204

| FILE NAME | FILE a | FILE b1 | FILE c |
|---|---|---|---|
| INPUT COUNT | 100 | 100 | |
| OUTPUT COUNT | | | 50 |

FIG. 12D

JOB D 1205

| FILE NAME | FILE b2 | FILE c |
|---|---|---|
| INPUT COUNT | 10 | 50 |
| OUTPUT COUNT | | |

| JOB NAME | JOB A | JOB B | JOB C | JOB D |
|---|---|---|---|---|
| END CODE | 0 | 0 | 0 | 0 |
| START TIME | 10:00 | 10:00 | 10:10 | 10:15 |
| END TIME | 10:10 | 10:05 | 10:15 | 10:20 |
| EXECUTION TIME | 600 SEC. | 300 SEC. | 300 SEC. | 300 SEC. |
| INPUT/OUTPUT RECORD | | | | |
| ABNORMAL FLAG | 000 | 000 | 000 | 000 |

*FIG. 13A*

JOB A        1302

| FILE NAME | FILE a |
|---|---|
| INPUT COUNT | |
| OUTPUT COUNT | 100 |

*FIG. 13B*

JOB B        1303

| FILE NAME | FILE b1 | FILE b2 |
|---|---|---|
| INPUT COUNT | | |
| OUTPUT COUNT | 100 | 50 |

*FIG. 13C*

JOB C 1304

| FILE NAME | FILE a | FILE b1 | FILE c |
|---|---|---|---|
| INPUT COUNT | 100 | 100 | |
| OUTPUT COUNT | | | 50 |

FIG. 13D

JOB D 1305

| FILE NAME | FILE b2 | FILE c |
|---|---|---|
| INPUT COUNT | 10 | 50 |
| OUTPUT COUNT | | |

FIG. 13E

ERROR RECOVERY METHOD AND APPARATUS IN A COMPUTER SYSTEM

BACKGROUND OF THE INVENTION

1. Field of the Invention

The present invention relates to recovery in a computer system at the abnormal end of a JOB for a repetitive execution of a JOB group.

2. Description of the Related Art

Japanese technical journal (HAITAC 1995. 11 pp. 1–4) teaches to display a JOB-net on the monitoring terminal so as to monitor a large scale of the JOB-net (that is, the JOB group to regulate the order of the multiple JOB execution, and execute in order). However, in order to recover from an occurrence of an error in the computer system, the way to detect the cause of error is by using experienced man power and outputting the execution result sequentially. In the above mentioned prior art, the cause analysis using a man power was required to recover from the error in the computer system, and therefore, it took too much time to recover from such error because the recovery time from the error depends upon the experience and hunch of the maintenance operators.

The purpose of this invention is to reduce the recovery time and find out the JOB causing the error for the purpose of supporting the error recovery.

SUMMARY OF THE INVENTION

An object of this invention is, therefore, in executing the JOB group multiple times, to compare the execution record of the JOB group when the error occurs with the execution record at the normal end, and detect the cause of error due to the compared result, by having the computer system accumulate the execution record for one or more JOBs included in the JOB group.

An object of this invention is to compare an end code when the error occurs with the end code at the normal end about the JOB of the corresponding JOB group and detect the JOB having a different end code as the cause of error, by having the computer system accumulate the end code of the JOB as the execution record.

Still another object of this invention is to compare an input/output count when the error occurs with an input/output count at the normal end about the JOB of the corresponding JOB group and detect the JOB whose input/output count is out of the minimum and maximum value of the range at the normal end, as the cause of error, by having the computer system accumulate the input/output count of the JOB as the execution record.

Still another object of this invention is to compare an execution time when the error occurs with the execution time at the normal end about the JOB of the corresponding JOB group and detect the JOB whose execution time is out of the minimum and maximum value of the range at the normal end, as the cause of error, by having the computer system accumulate the execution time of the JOB as the execution record.

BRIEF DESCRIPTION OF THE DRAWINGS

Embodiments of the present invention are described below in conjunction with the figures, in which:

FIGS. 2A, 2B, and 2C are tables showing the JOB execution record;

FIGS. 3A and 3B are tables showing an exemplary arrangement of the JOB flow definition information controlling the execution of the JOB;

FIG. 4 is a table showing an exemplary arrangement of the file of the JOB flow used for monitoring the JOB;

FIGS. 12A–12E are example tables showing the JOB execution record, as shown in FIG. 11A and 11B; and FIGS. 13A–13E are example tables showing the JOB standard record, as shown in FIG. 11A and 11B.

DESCRIPTION OF THE PREFERRED EMBODIMENT

A description will be given of the present invention embodiments by reference to the accompanying drawing.

Figure 1:
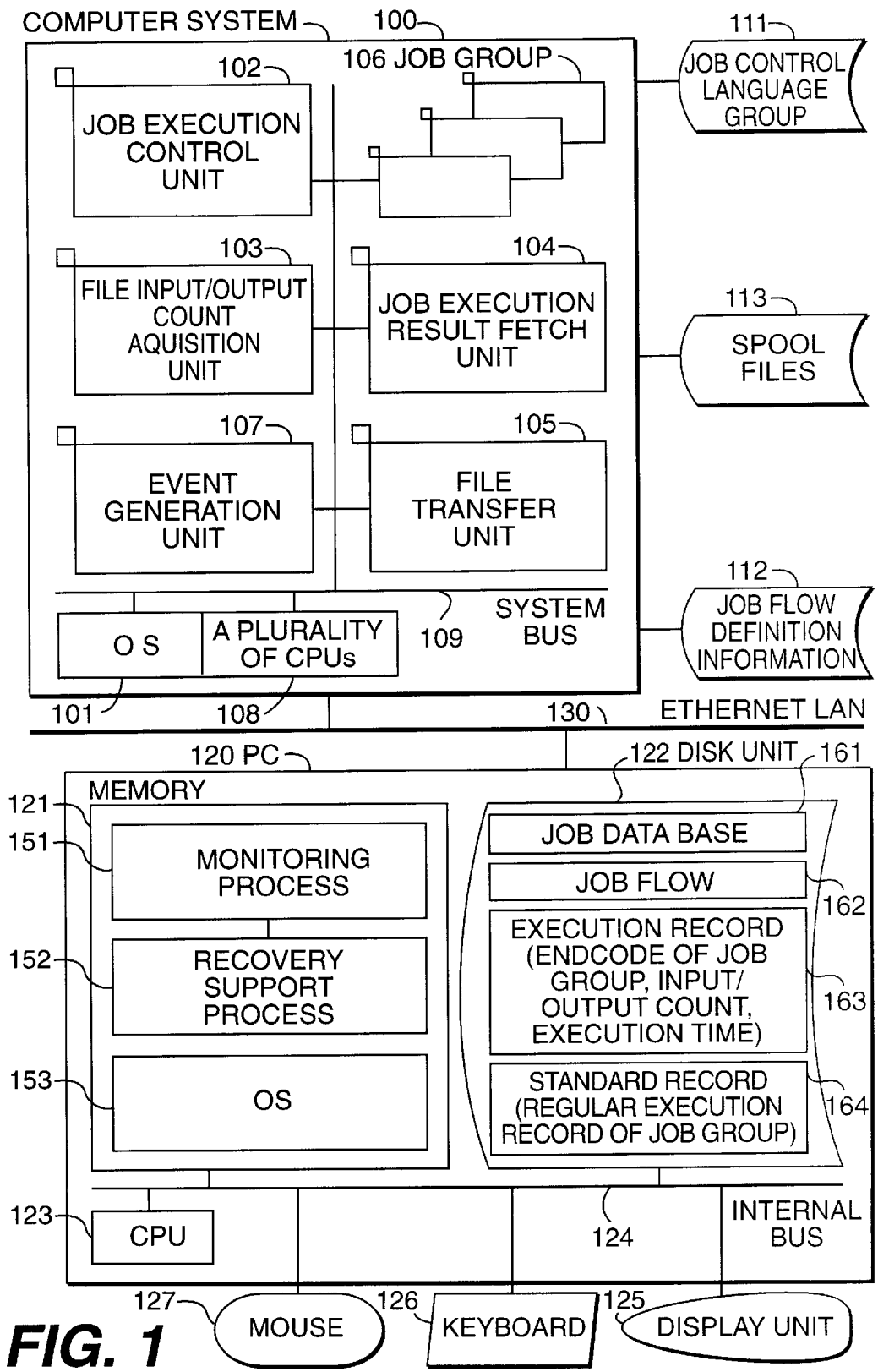
FIG. 1 is an overall block diagram showing an exemplary arrangement embodying the present invention.

FIG. 1 shows an exemplary arrangement embodying the present invention. In FIG. 1, the computer system 100 executes the JOB group 106 with a plurality of CPUs 108, the personal computer 120 (hereinafter, PC) supports the error recovery, and an Ethernet-LAN 130 links together the computer system 100 and the PC 120. The file 111 stores a Job Control Language (hereinafter, JCL) of the JOB group 106, which the JOB execution control unit 102 controls. The file 112 stores job flow definition information, which defines the execution order of the JOB group 106.

The programs, 101 through 108, are executed in the computer system 100, and comprise: the operating system 101 (hereinafter, OS) running on the computer system 100; the JOB execution control unit 102 controlling the execution of the JOB group 106; the file input/output count acquisition unit 103 that monitors the number of file input/outputs during execution of each JOB of the JOB group 106; the JOB execution result fetch unit 104 fetching the JOB execution result stored in one of the spool files 113; the file transfer unit 105 that transfers the information of the JCL group 111, the JOB flow definition information 112, and the input/output count that the file input/output count acquisition unit 103 obtains, into the PC 120; the JOB group 106 comprising a plurality of JOBs; the event generation unit 107 called from both the JOB execution control unit 102 and the file input/output count acquisition unit 103; and a plurality of CPUs 108 performing sequential and/or parallel executions of each JOB of the JOB group. Each program, 101 through 108 are all connected via system bus 109.

PC 120 has a memory 121, a disk unit 122, CPU 123 for executing instructions, a display unit or monitor 125, a keyboard 126, and a mouse 127. The memory 121, disk unit 122, CPU 123, display unit 125, keyboard 126, and mouse 127 are all connected via an internal bus 124.

The programs 151, 152 and 153 are loaded into the memory 121 of the PC 120 and executed in the CPU 123. The monitoring process 151 monitors the JOB group 106, the recovery support process 152 is activated when in response to occurrence of an error during execution of the JOB group 106, and the OS 153 controls both the monitoring process 151 and recovery support process 152.

The data 161 through 164 are stored into the disk unit 122, and comprise: a JOB database (DB) 161 generated based upon the JCL and both the JOB end event and close-event generated in the event generation unit 107; the job flow data 162 that is added as the display information after downloading the JOB flow definition information 112 into the PC 120 by the file transfer unit 105; the execution record 163 of the JOB group 106 gathered through the monitoring process 151 and the recovery support process 152; and the standard record 164, whose content is the execution record when the JOB group 106 functions normally.

The following is the outline of the operation of this invention, referring to FIG. 1.

The computer system 100 transfers both the JOB flow definition information 112 and the JCL group 111 into the PC 120 by the file transfer unit 105, and the PC 120 stores both of them in the disk unit 122 in the format of the JOB DB 161 and the JOB flow 162.

The JOB execution control unit 102 executes the JOBs in accordance with the JOB flow definition information 112.

The JOB execution control unit reads the JOB name to be executed from the JOB flow definition information 112 and fetches the JCL 111 of the JOB to be executed. After activating the corresponding JOB, the JOB execution control unit 102 calls the event generation unit 107 and transfers the execution start event into the monitoring process 151 in the PC 120. After executing the corresponding JOB in a CPU 108, the JOB execution control unit 102 calls the event generation unit and transfers the execution end event into the monitoring process 151 at the same time the JOB execution ends. The input/output count acquisition unit 103 is called by the extended close process of the JOB group 106 to generate a file input/output count that is transferred into the monitoring process 151. The computer system 100 calls the event generation unit and transfers a close-event into the monitoring process 151 in the PC 120 via the event generation unit 107.

The monitoring process 151 in the PC 120 sets the execution start time, the execution end time, and the file input/output count into the execution record 163 after receiving the execution start event, the execution end event, the close-event, and the file input/output count.

If some error occurred in the JOB group 106 operated in the computer system 100, the monitoring process 151 calls the recovery support process 152: compares the execution record 163 with the standard record 164 and detects a candidate JOB causing error; investigates the relationship between the candidate JOB causing error and the JOB generating error from the JOB DB 161 and JOB flow 162; and detects the JOB causing error. This detection may be done automatically by one of the CPU's 108 assigned for recovery without any operator assistance.

However, the preferred embodiment uses operator assistance to make such detection or determination of which job caused the error. The recovery support process 152 displays both the JOB causing error to be detected and the JOB route (related to the JOB between the candidate JOB causing error and the JOB generating error) on the display unit 125. The computer operator re-executes the JOB chosen by the keyboard 126 and/or the mouse 127 after executing the recovery process, such as a reassignment of the input/output file of the displayed JOB. Due to the operator's instruction, the recovery support process 152 displays both the file list accessed by the JOB and the JOB list accessing the file, referring to the JOB DB 161.

FIG. 2A shows a table of the execution record 163, and comprises: a JOB name field 200 storing the JOB name; the end code field 210 of the JOB name 200; the start time field 220 of the JOB name 200; the end time field 230 of the JOB name 200; the execution time field 240 of the JOB name 200 on the condition that the execution time=the start time—the end time; the file input/output record field 250 of the JOB name 200; and the abnormal flag field 260 set by the recovery support process 152.

FIG. 2B shows a detailed table of the file input/output record field 250 and comprises: the file name field 251 of the file accessed by the JOB shown in the JOB name 200; the input count field 252 into which the JOB shown in the JOB name 200 stores the input count from the file shown in the file name 251; and the output count field 253 into which the JOB shown in the JOB name 200 stores the output count from the file shown in the file name 251.

FIG. 2C shows a detailed table of the abnormal flag field 260 and comprises: the input/output count bit 261; the execution time bit 262; and the end code bit 263.

Figure 8:
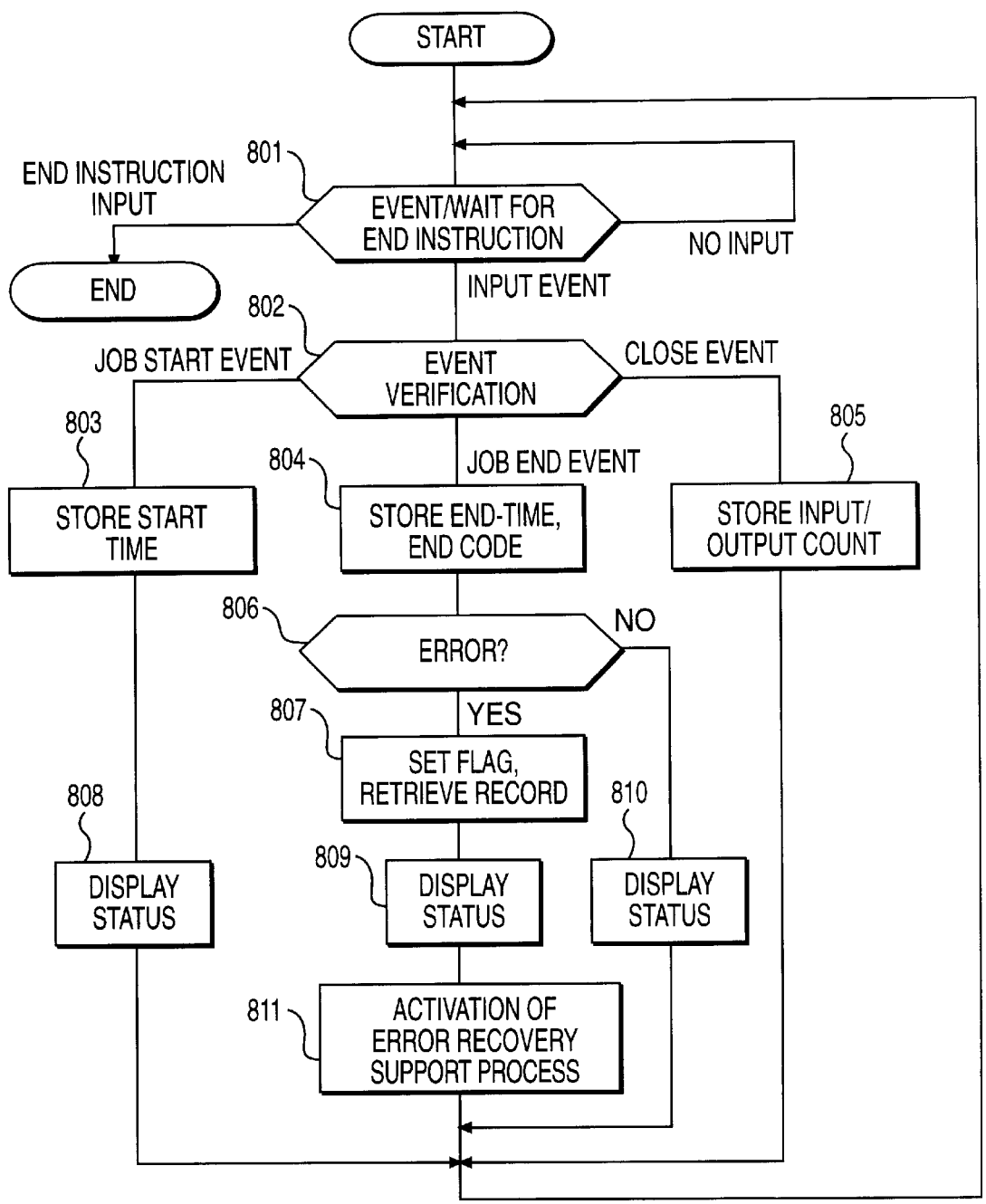
FIG. 8 is a flow chart showing the monitoring process of monitoring execution of the JOB.

The data stored in the above mentioned JOB name 200 or the file input/output record field 250 are obtained from the monitoring process 151 shown in FIG. 8. The data of the abnormal flag field 260 is obtained from the process of the step 901 shown in FIG. 10 in the recovery support process shown in FIG. 9.

FIGS. 3A and 3B are tables of the JOB flow definition information 112, which comprises a JOB definition 310 and the preceding JOB definition 320. The JOB definition 310 comprises: an identifier field 311 storing a character string, 'MJJO' showing that the corresponding record is the JOB definition; and the JOB name field 312 storing the JOB name controlled by the JOB execution control unit 102. The preceding JOB definition 320 comprises: the identifier field 321 storing a character string, 'MJWO' showing that the corresponding record is the JOB definition; the JOB name field 322 stored the JOB name to be activated when the JOB stored in the preceding JOB name field 323 ends; and the preceding JOB name field 323.

The JOB execution control unit performs the following steps:

1) controls the JOB's 1 through 4.
2) activates the JOB 3 when both the JOB 1 and JOB 2 end.
3) activates the JOB 4 when the JOB 3 ends.

FIG. 4 is a table showing an example for the JOB 3 shown in FIGS. 3A and 3B as well as the structure of the JOB flow 162. The corresponding items and data for the JOB are stored into the JOB flow 162.

The JOB No. (or JOB assignment number) 410 is the JOB serial number defined in the JOB flow definition information 112. The JOB name 420, the arranged position 430 of the node showing the JOB, X coordinate 431, Y coordinate 432, the JOB status 440 (that is, awaiting execution, under execution, and the end of the execution), the preceding JOB list 450, and the following JOB list 460 are shown in FIG. 4. The preceding JOB list comprises the number of the JOB 451 and the JOB No. 452. The following JOB list comprises the number of the JOB 461 and the JOB No. 462. The preceding JOB list has two cases whose JOB No. are each '001' and '002' and the following JOB has a case whose JOB No. is '004'. The JOB flow 162 is generated based upon the JOB flow definition information 112.

Figure 5A:
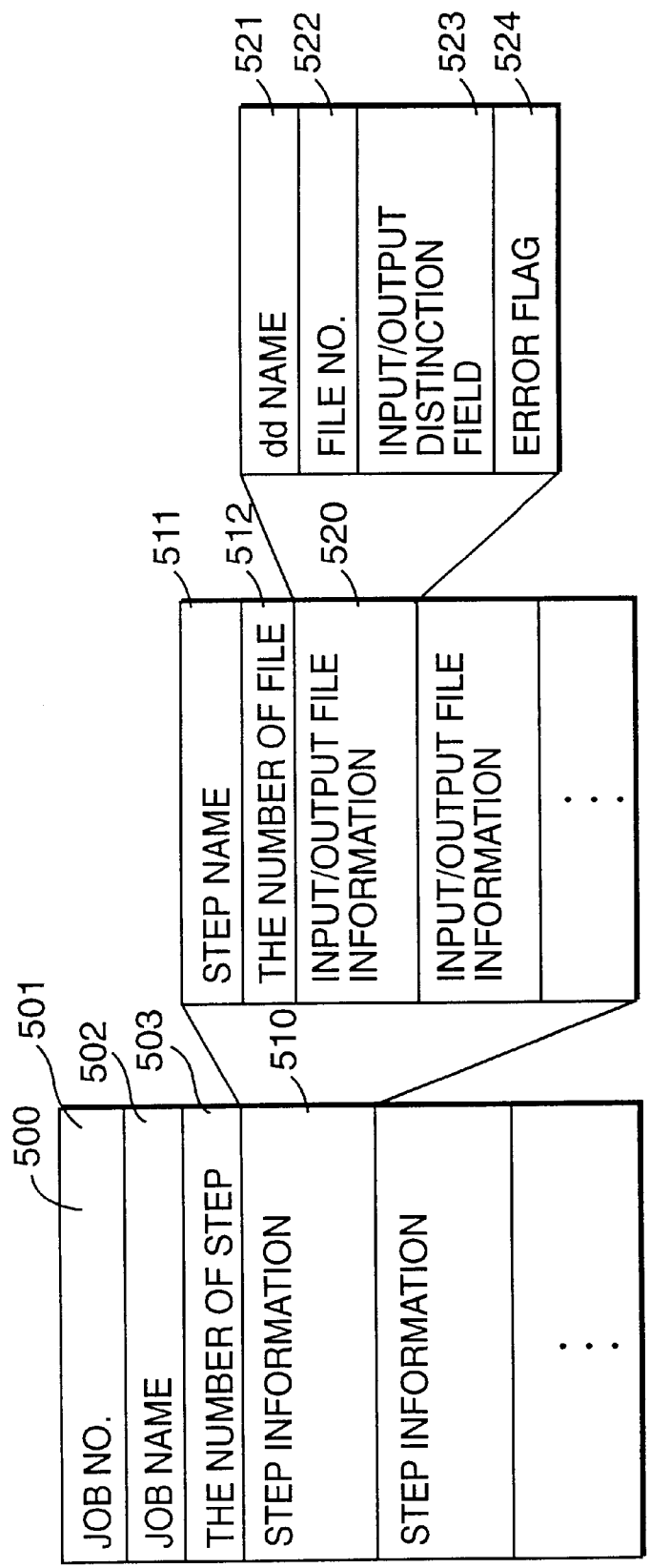
FIGS. 5A and 5B are tables showing an exemplary arrangement of the JOB data base(hereinafter, DB)
Figure 5B:
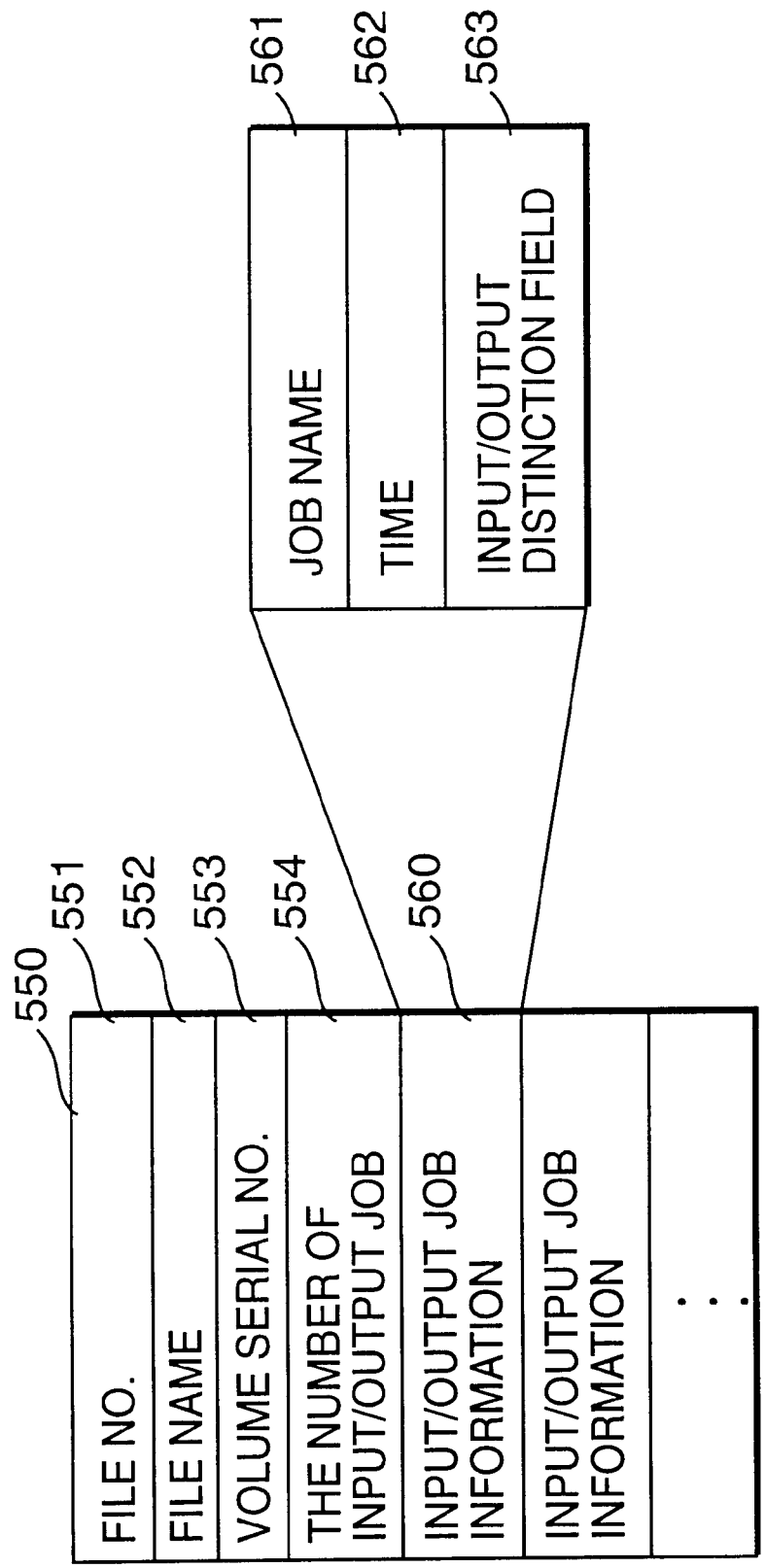

FIGS. 5A and 5B are tables showing the structure of the JOB DB 161. The JOB DB 161 comprises a JOB information 500 generated for the JOB and the file information 550 generated for the file.

The JOB information 500 comprises: the JOB No. field 501 storing the JOB No. 410 of FIG. 4; the JOB name field 502 storing the JOB name 420 of FIG. 4; the step number field 503 storing the number of the JOB step of the corresponding JOB; and the step information 510 showing the number stored in the step number field 503. The step information 510 comprises the step name field 511, the file number field 512 storing the number of file referred to in the corresponding step, and the input/output file information 520 showing the number stored in the file number field 512. The input/output file information 520 comprises a dd name field 521 of the corresponding file, the file No. field 522, the input/output distinction field 523, and an error flag field 524.

The file information 550 comprises the file No. field 551, the file name field 552, the volume serial number field 553, the input/output JOB number field 554, and the input/output JOB information 560 showing the input/output JOB number stored in the input/output JOB number field. The input/output JOB information 560 comprises the JOB name field 561, the time field 562, and the input/output distinction field 563.

Figure 7A:
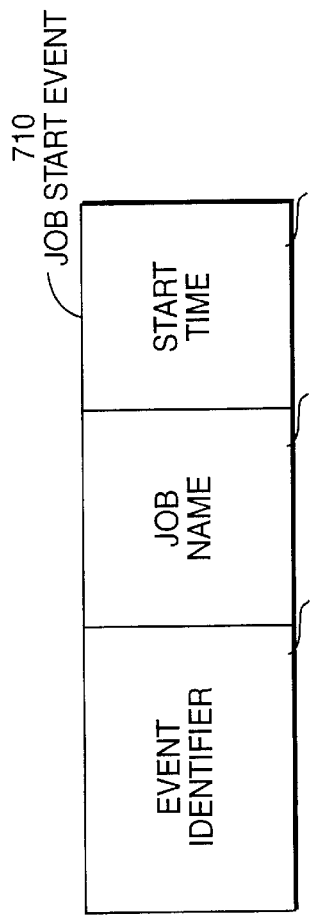
FIGS. 7A, 7B, and 7C are diagrams showing a format of events being transferred from the computer system executing the JOB to the computer system monitoring the JOB.
Figure 7B:
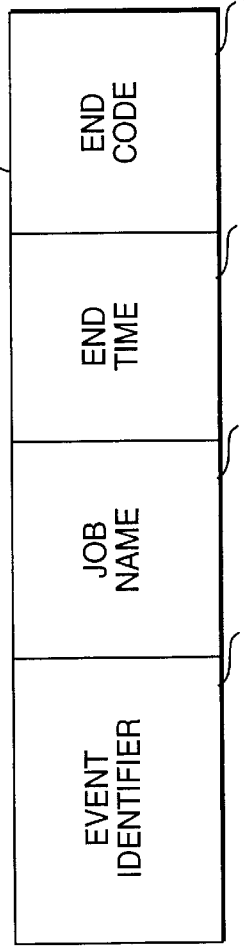

The above mentioned JOB information 500 is generated based upon the JCL and the error flag is generated based upon the end code in the JOB end event 720 of FIG. 7B. The file information 550 is generated based upon the JCL and the input/output JOB information 560 is generated based upon the close event 730 of FIG. 7C.

Figure 6A:
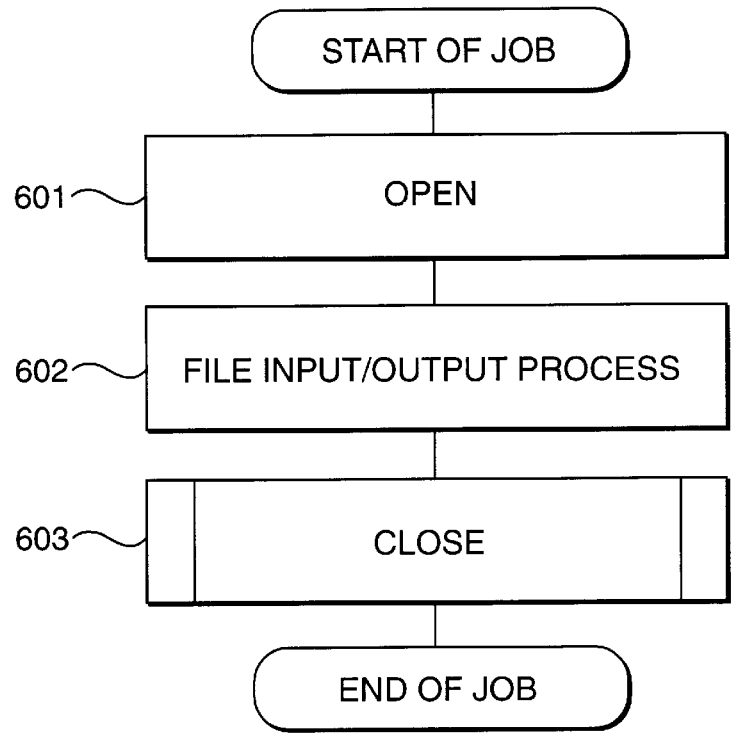
FIGS. 6A and 6B are flow charts showing the acquisition of the file input/output count for a JOB.
Figure 6B:
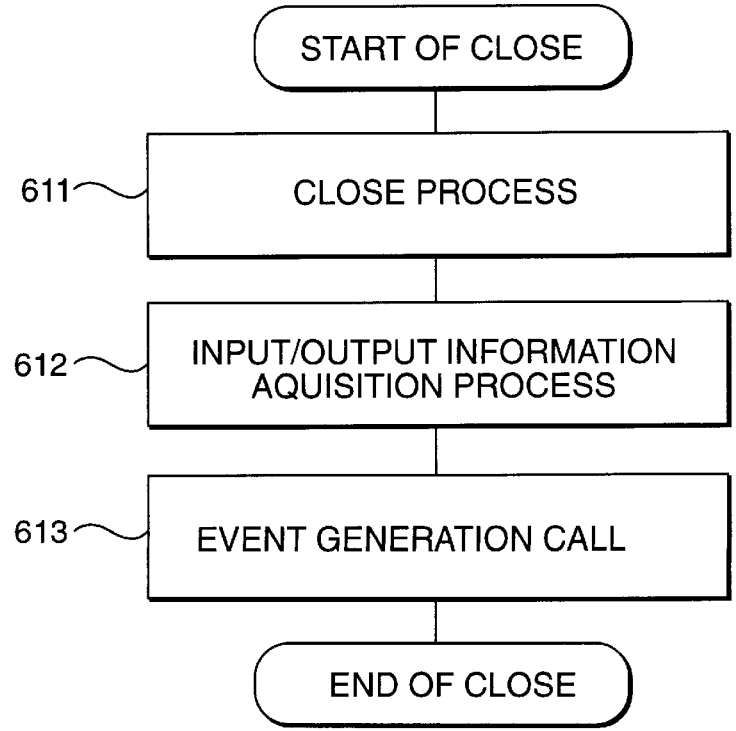

FIGS. 6A and 6B are flow charts showing the operation of the input/output count acquisition unit 103.

In a conventional file input/output process, the JOB group 106 opens the file at the process 601, executes the file input/output process 602, and then calls the file-close process 603.

The embodiment of this invention adds the input/output count acquisition process 612 into the user exit routine called at the extension of the file-close process. Concretely, at the end of the normal file-close process 611, the JOB group 106 executes both the input/output information acquisition process 612 and the event generation call process 613.

Figure 7C:
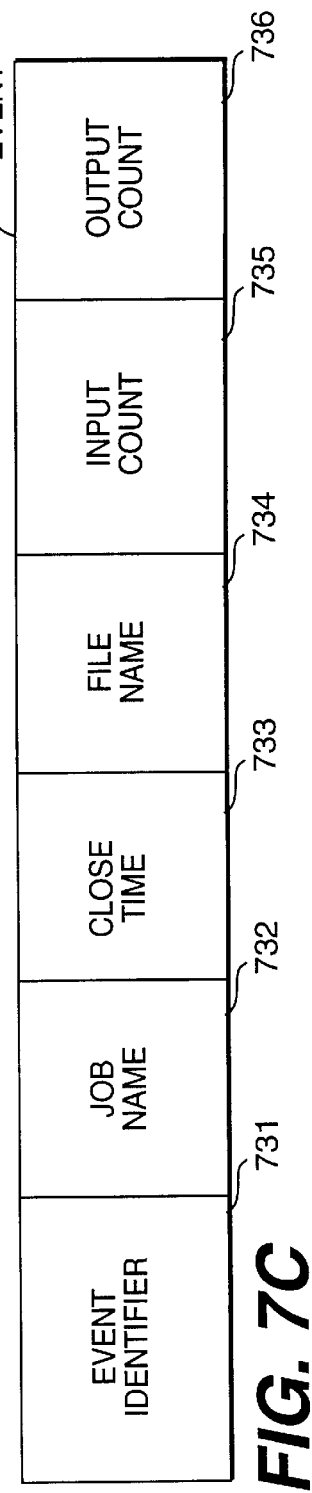

The kinds of and formats of events generated by the called event generation unit 107 are shown in FIGS. 7A, 7B, and 7C.

The JOB start event 710 is outputted to the PC 120 by the JOB execution control unit 102, which calls the event generation unit 107 at the beginning of the JOB execution of the JOB group 106. The JOB start event 710 includes the event identifier 711, job name 712 involved in the event generation and start time 713.

The JOB end event 720 is outputted to the PC 120 at the end of the execution of the JOB group 106. The JOB end event 720 includes the event identifier 721, job name 722 involved in the event, the end time 723, and the end code 724.

The close event 730 is outputted to the PC 120 by calling the event generation unit 107 at the file-close process of the JOB group 106. The close event 730 includes the event identifier 731, the job name 732, the close time 733, the file name 734, the input count 735, and output count 736.

FIG. 8 is a flow chart of the monitoring process 151.

The monitoring process 151 waits for the event generation or the end instruction at the step 801, after it turns on. If it receives the end instruction, the monitoring process 151 ends.

If an event occurs, the monitoring process 151 moves to the step 802 and checks what kind of event occurred. If the event is the JOB start event 710, the monitoring process 151 moves to the steps 803 and 808. If the event is the JOB end event 720, the monitoring process 151 moves to the step 804. If the event is the close event 730, the monitoring process 151 moves to the steps 805.

The monitoring process 151 stores the start time 713 into the start time field 220 under the corresponding job name of FIG. 2A, at the step 803. The monitoring process 151 stores the file name 734, the input count 735 and the output count 736 into the input/output record 250 of FIG. 2A, at the step 805.

The monitoring process 151 stores the end time 723 into the end time field 230 under the corresponding job name of FIG. 2A and the end code 724 into the end code field 210 under the corresponding job name, at the step 804. The step 804 calculates the execution time (the execution time=the end time 723–the start time 713) and stores the calculated execution time into the execution time field 240; then the monitoring process 151 moves to the step 806.

The monitoring process 151 checks, at the step 806, whether there is an error in the JOB as indicated by the end code 724 of FIG. 7B.

If there is an error in the JOB, the monitoring process 151: sets the abnormal flag 260 under the JOB name 722 as the error generated JOB, obtains and stores the execution record 163 of the JOB and at the step 807; and displays the status on display unit 125 and activates the error recovery support process at the step 811. If there is no error in the JOB, the monitoring process 151 displays the status on the display unit 125 at step 810.

The monitoring process 151 returns to the step 801 at the end of each of steps 805, 808, 810, and 811. After that, it waits for the next event or end instruction at step 801.

Figure 9:
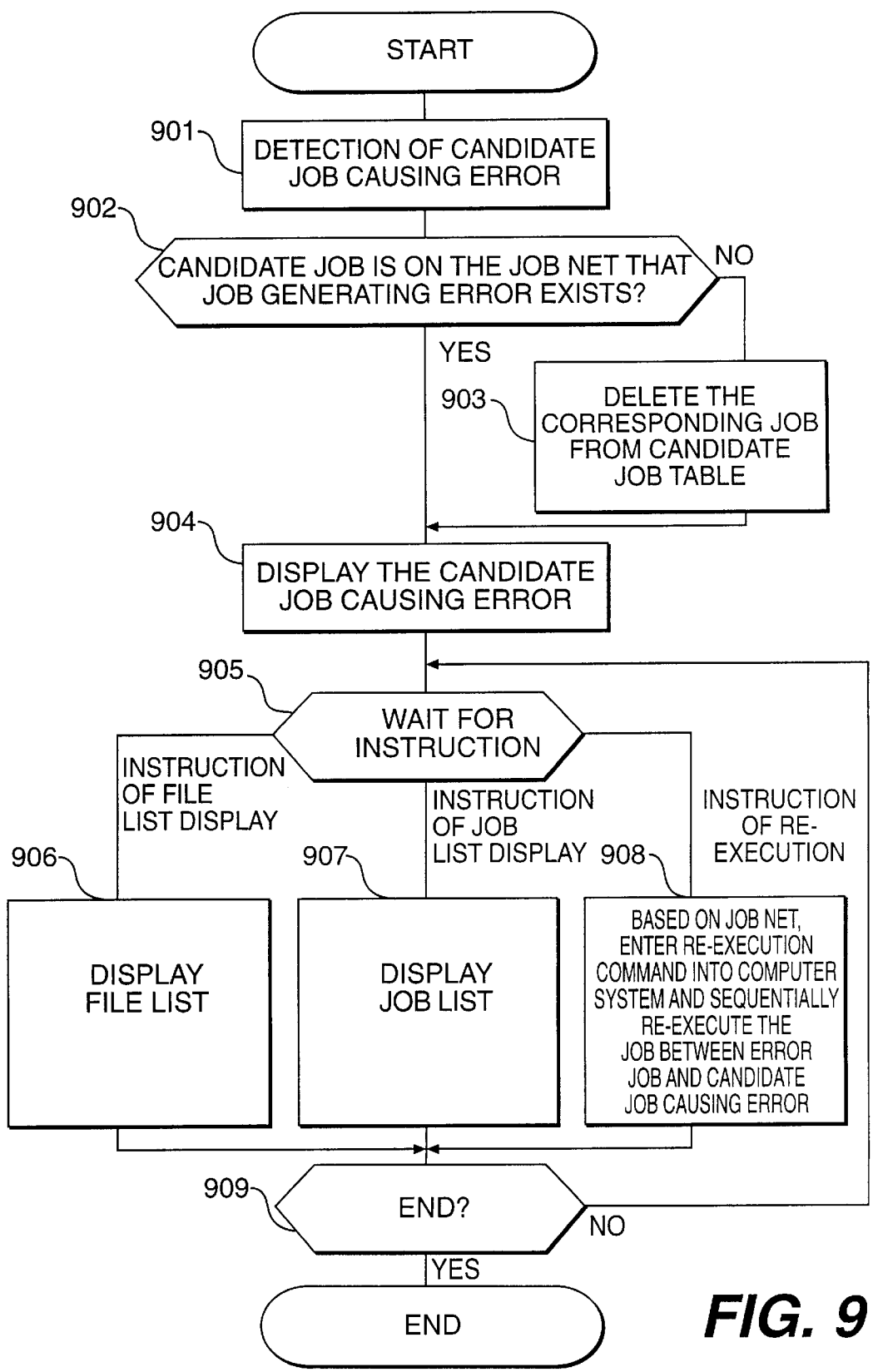
FIG. 9 is a flow chart showing the error recovery support process.

FIG. 9 is a flow chart of the recovery support process 152. The recovery support process 152 executes the steps 901 through 903 for the JOB controlled by the JOB execution control 102.

The recovery support process 152 detects the candidate JOB causing error at the step 901 and registers the JOB detected at the step 901 into a candidate JOB table e.g. in RAM of the CPU 123. Next, the step 902 checks whether the candidate JOB causing error is on the JOB-net that the JOB generating error exists. If the check of step 902 results in NO, step 903 removes the corresponding JOB from both the candidate JOB table and the candidate causing error.

After displaying the candidate JOB causing error on the display unit 125 at the step 904, the recovery support process 152 waits for an instruction at the step 905. The operator instructs the PC 120 to display the file list or the JOB list, or re-execute the above process with the keyboard 126 or mouse 127.

When instructed in step 905 to display the file list, the recovery support process 152 refers to the JOB information 500 of the JOB DB 161 in FIG. 5A and displays the input/output file information of the corresponding JOB on the display unit 125 at step 906.

When instructed in step 905 to display the JOB list, the recovery support process 152 refers to the file information 550 of the JOB DB 161 and displays the list of the JOB information accessing the file on the display unit 125 at step 907.

The operator refers to the display unit 125 for the display of both the file list resulting from step 906 and the JOB list resulting from step 907, and then the operator instructs the PC 120 to re-execute after the recovery and reassignment of the file. After either step 906 or step 907, step 909 returns the process to step 905.

When the recovery support process 152 receives the re-execution instruction in step 905, then step 908: enters the re-execution command into the computer system 100 in accordance with the JOB-net; sequentially re-executes the JOB between the error JOB and the candidate JOB causing error; and issues an END instruction. When step 909 receives the END instruction the recovery support process 152 ends.

Figure 10:
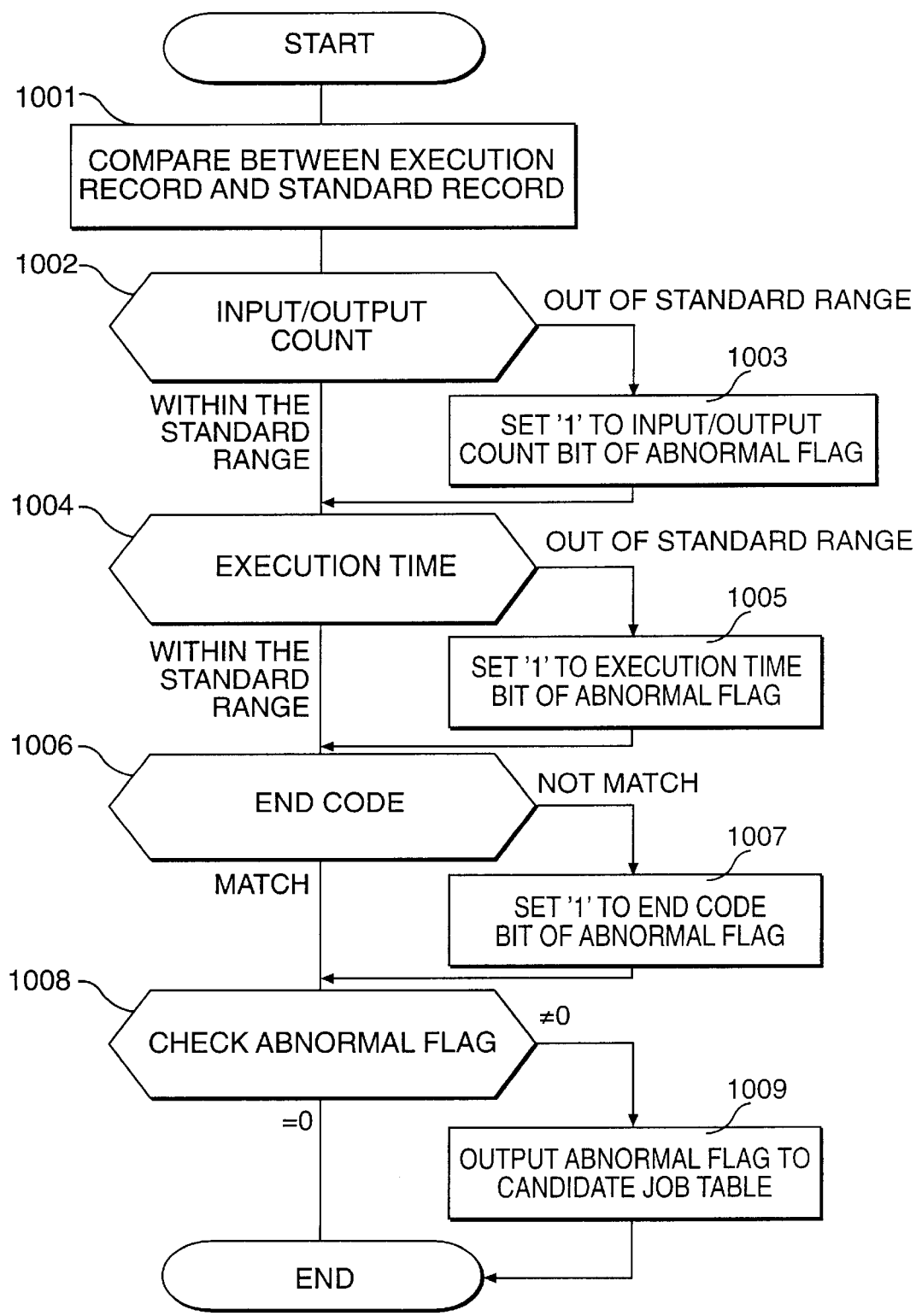
FIGS. 10 is a flow chart showing the detection process of the candidate JOB causing error for the error recovery support process.

FIG. 10 is a detailed flow chart of the step 901 in FIG. 9. All of the JOB endings during the execution go through this process.

The recovery support process 152 compares the standard record with the execution record and executes the next step based upon the corresponding result at the step 1001.

The recovery support process 152 checks whether the input/output count (from unit 103) is within the standard range (obtained from the standard record 164) or not at the step 1002. If the input/output count is out of the standard range, '1' is set to the input/output count bit 261 of the abnormal flag 260 of the execution record 163 in FIG. 2C at the step 1003.

The recovery support process 152 checks whether the execution time is within the standard range at the step 1004. If the execution time is out of the standard range, '1' is set to the execution time bit 262 of the abnormal flag 260 of the execution record 163 in FIG. 2C at the step 1005.

The recovery support process 152 checks whether the end code of the standard record and execution record accords at the step 1006. If the end code does not accord, '1' is set to the end code bit 263 of the abnormal flag 260, at step 1007.

The recovery support process 152 checks the abnormal flag 260 at the step 1008 and when the flag is not equal to '0', outputs the abnormal flag to the candidate JOB table in step 1009. Moreover, in step 1009, when the recovery support process 152 thus detects the candidate JOB causing error, it calculates the execution time for an input/output operation based upon both the execution time and the input/output count of the JOB for the execution record 163 for the JOB, compares the above calculated execution time for an input/output operation when the error occurs with that of the normal end about the JOB of the JOB group, and stores identification of the JOB, whose execution time for an input/output operation does not accord with the normal (e.g. is out of the maximum and minimum value of the normal end), as the JOB caused that error among all of the executed JOBs. The recovery support process 152 (in step 1009) compares the execution record 163 of the normal end with the execution record 163 when the error occurs in executing the preceding JOB which decides a condition to execute the JOB having an error, and considers the execution of the preceding JOB as the cause of error when the comparison does not accord.

FIGS. 11 through 13 show a concrete example of the recovery procedure after the error occurs.

Figure 11A:
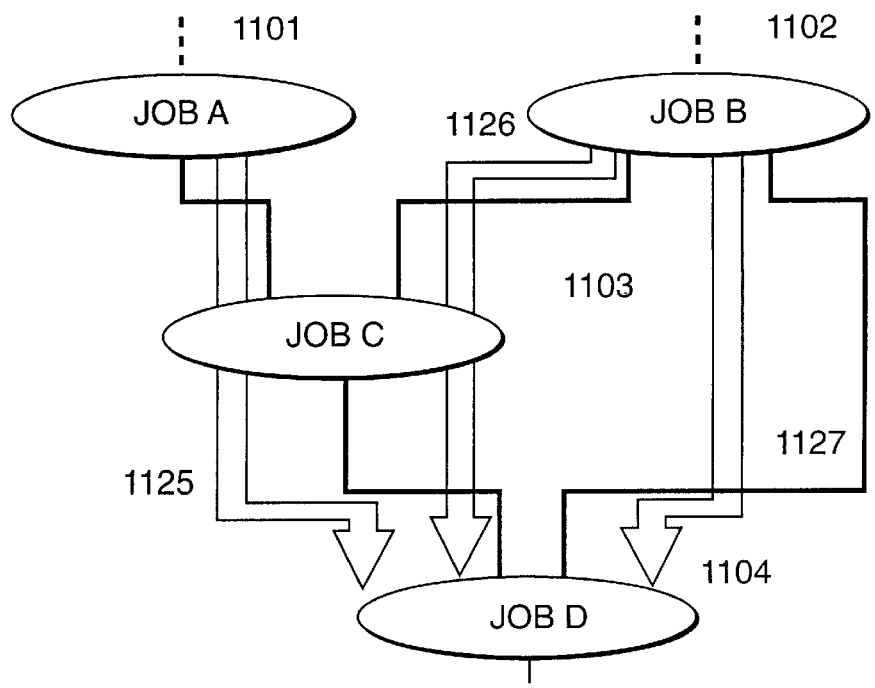
FIGS. 11A and 11B are conceptual diagrams of an example of the JOB flow information.

FIG. 11A shows the conceptual diagram of an example of the JOB flow. The JOB group 1101 through 1104 are executed according to the JOB routes 1125 through 1127. The solid lines connecting between the JOBs 1101, 1102, 1103 and 1104 show the execution order of the corresponding JOBs. This diagram illustrates that the JOB C 1103 starts to execute at the end of the parallel execution of both the JOB A 1101 and JOB B 1102, and the JOB D 1104 starts to execute at the end of the execution of both the JOB B 1102 and JOB C 1103.

Figure 11B:
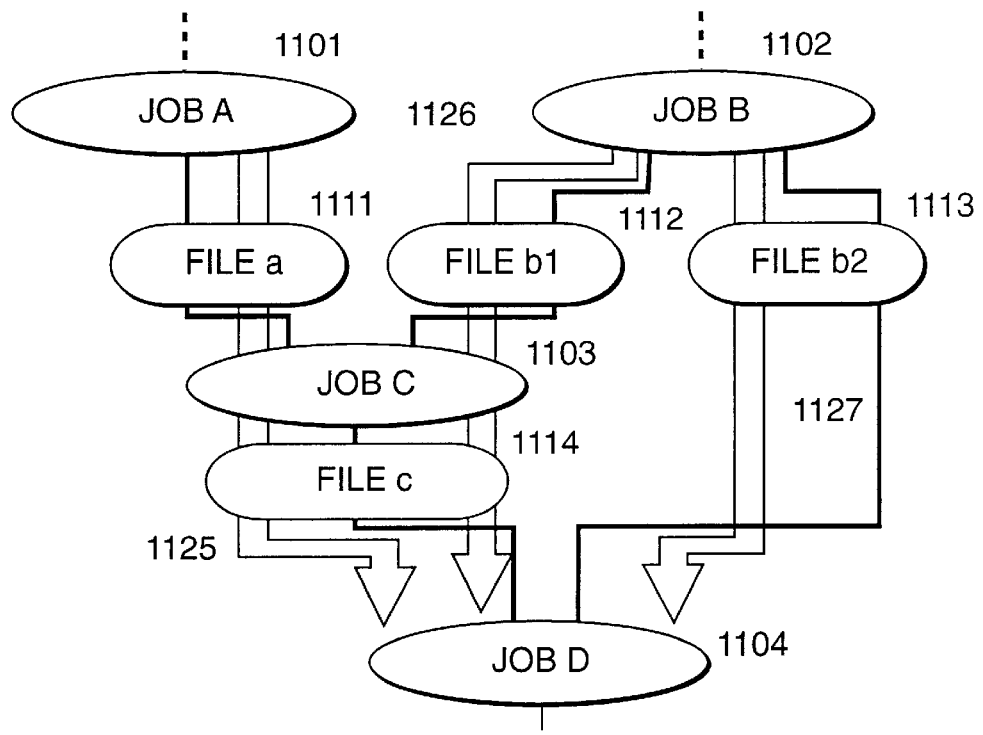

FIG. 11B shows the relationship between the JOBs in FIG. 11A and the files accessed by each JOB.

This diagram illustrates that: the JOB B 1102 outputs both the file b1 1112 and file b2 1113; the JOB A 1101 outputs the file a 1111; the JOB C 1103 inputs both the file a 1111 and the file b1 1112, and outputs the file c 1114; and the JOB D 1104 inputs both the file b2 1113 and c 1114. The relationship between the JOB and corresponding file is defined in the JOB DB of FIGS. 5A and 5B.

FIG. 12A shows an example table 1201 of the execution record 163 of the JOB shown in FIGS. 11A and 11B. The execution record example table 1201, includes the details 1202 through 1205 of the input/output record of the JOB A through JOB D.

The table 1301 of standard record of each of the JOBs A through D are shown in FIG. 13A, where details 1302, 1303, 1304 & 1305 are shown.

In these tables 1201, the following items are defined.
(1) The error occurs at the time of executing the JOB D.
(2) The standard range of the file input/output count is within ±10 counts.

In the embodiment of this invention, the error of the JOB D is recognized at the step 806 of FIG. 8 due to the JOB end event 720 of FIG. 7B and the error recovery support process shown in the flow chart of FIG. 9 is activated at the step 811.

The error recovery support process: compares the execution record with the standard record and displays the JOB causing error on the display unit; and judges that each of the JOBs A, B and D is a candidate JOB causing error and displays them on the display unit 125 because the end code of the execution record of each of the JOBs A, B and D is different from the end code of the standard record, each of the JOBs A, B and D is on a JOB route for the JOB D where the error occurred, and the input/output count for the file b2 of the JOB B is out of the standard range.

The computer operator instructs the PC 120 to display the file list accessed by the JOB B and recognizes that the JOB B outputs both the file b1 and b2 because the execution record of the JOB B is different from the standard record of the JOB B for both the end code and the input/output count. Next, the computer operator instructs the PC 120 to display the JOB list accessing the file b2, whose input/output count is out of the standard range, on the display unit 125 and recognizes that the JOB D inputs the file b2.

Through the above mentioned process, the operator judges the cause of error occurring in the JOB D is the JOB B and understands the re-execution of both the JOB B and the JOB D is required to recover from the error. The operator checks the process of the JOB B, reassigns either the file b1 and b2 or the file b2, and instructs the PC 120 to re-execute both the JOB B and D.

The execution results obtained by executing the JOBs of the JOB group when an error occurs are compared with standard results, preferably obtained by prior normal executions of the same JOB group (with the same or different input data). Such comparison is conducted by the PC 120 (the preferred embodiment) or by an assigned one of the CPUs 108, with decisions being made by an operator based upon displayed data (the preferred embodiment) or by the recovery support process 152, using thresholds, AI, etc., without operator assistance.

Hence, this invention easily detects the JOB causing error when the error occurs in the huge scale of the JOB-net and easily detects the file required to recover, when re-executing the JOB, by displaying the file list the JOB accessed and the JOB list accessing the file.

Various modifications of the preferred embodiments of the invention described above will become apparent to the person of ordinary skill in the art upon reading this disclo-

We claim:

1. A computer system for executing a JOB group comprising a plurality of JOBs, comprising:
an error recovery routine;
a file storing a command language of the JOB group;
a JOB execution control unit controlling execution of the JOB group;
a JOB flow definition information;
an input/output count acquisition unit obtaining an input/output count from the execution of the JOB group;
an event generation unit generating events during the execution of the JOB group;
a storage device storing the input/output count for each of the JOBs executed and the events generated for each of the JOBs executed as an execution result;
an execution result fetch unit fetching the execution result stored in said storage device upon the occurrence of an error; and
a file transfer unit transferring the execution result, information of the command language, and the JOB flow definition information into said recovery routine.

2. The computer system according to claim 1, wherein the command language is a JOB control language.

3. The computer system according to claim 1, wherein said storage device is a spool file.

4. The computer system according to claim 1, wherein the events are a JOB start, a JOB end, and a close-event.

5. The computer system according to claim 1, wherein said JOB flow definition information comprises a JOB definition and a preceding JOB definition.

6. The computer system according to claim 4, said recovery routine including a monitoring process; and
wherein said file transfer unit transfers the close-event into a monitoring process in the recovery routine via the event generation unit.

7. The computer system according to claim 1, wherein the events include an execution start event;
said recovery routine including a monitoring process; and
wherein said JOB execution control unit calls said event generation unit and transfers an execution start event into said monitoring process.

8. The computer system according to claim 1, wherein the events include an execution end event;
said recovery routine including a monitoring process; and
wherein said JOB execution control unit transfers an execution end event into said monitoring process at the time a JOB ends.

9. The computer system according to claim 1, wherein said recovery routine stores both the JOB flow definition information and JOB control language by format of a JOB DB and JOB flow.

10. The computer system according to claim 4, wherein said recovery routine includes a monitoring process that sets an execution start time, an execution end time, and a file input/output count into an execution record after receiving the execution start event, execution end event and close-event.

11. The computer system according to claim 10, wherein said recovery routine has a recovery support process, and said monitoring process calls the recovery support process when the error occurs in the execution of the JOB group.

12. An error recovery support process that can be executed in a recovery routine executed in one of a plurality of CPUs in a computer system, comprising:
executing a plurality of JOBs of a JOB group multiple times and storing an execution record for each JOB executed;
comparing the execution record of the JOB group when an error occurs with a regular execution record of the JOB group, the regular execution record being the execution record when the JOB group was executed normally;
detecting the cause of the error from said comparing;
storing an end code as the execution record for each execution of a JOB;
wherein said comparing compares the end code when the error occurs with the end code when no error occurs for JOBs of the JOB group and said detecting detects a JOB having a different end code as the cause of the error;
storing an execution time of each JOB as the execution record for the JOB;
wherein said comparing compares the execution time when the error occurs with the execution time when no error occurs for JOBs of the JOB group; and
wherein said detecting detects a JOB, whose execution time is out of a fixed minimum and maximum value of the execution time when no error occurs, as the cause of the error; and:
storing an input/output count as the execution record for each execution of a JOB;
wherein said comparing compares the input/output count when the error occurs with the input/output count without an error and
said detecting detects a JOB, whose input/output count is out of a fixed amount greater or less than the input/output count when no error occurs, as the cause of the error.

13. An error recovery support process that can be executed in a recovery routine executed in one of a plurality of CPUs in a computer system, comprising:
executing a plurality of JOBs of a JOB group multiple times and storing an execution record for each JOB executed:
comparing the execution record of the JOB group when an error occurs with a regular execution record of the JOB group, the regular execution record being the execution record when the JOB group was executed normally;
detecting the cause of the error from said comparing;
storing an end code as the execution record for each execution of a JOB;
wherein said comparing compares the end code when the error occurs with the end code when no error occurs for JOBs of the JOB group and said detecting detects a JOB having a different end code as the cause of the error;
storing an execution time of each JOB as the execution record for the JOB;
wherein said comparing compares the execution time when the error occurs with the execution time when no error occurs for JOBs of the JOB group; and wherein said detecting detects a JOB, whose execution time is out of a fixed minimum and maximum value of the execution time when no error occurs, as the cause of the error; and wherein said detecting detects a candidate JOB causing error, investigates a relationship between the candidate JOB causing error and a JOB of a JOB group generating the error from a JOB DB and JOB flow, and then thereby detects a JOB causing error.

14. An error recovery support process that can be executed in a recovery routine executed in one of a plurality of CPUs in a computer system, comprising:

executing a plurality of JOBs of a JOB group multiple times and storing an execution record for each JOB executed;

comparing the execution record of the JOB group when an error occurs with a regular execution record of the JOB group, the regular execution record being the execution record when the JOB group was executed normally;

detecting the cause of the error from said comparing;

storing an end code as the execution record for each execution of a JOB;

wherein said comparing compares the end code when the error occurs with the end code when no error occurs for JOBs of the JOB group and said detecting detects a JOB having a different end code as the cause of the error;

storing an execution time of each JOB as the execution record for the JOB;

wherein said comparing compares the execution time when the error occurs with the execution time when no error occurs for JOBs of the JOB group; and wherein said detecting detects a JOB, whose execution time is out of a fixed minimum and maximum value of the execution time when no error occurs, as the cause of the error:

storing an input/output count, and execution time as the execution record;

calculating the input/output time for input/output operation based upon both the execution time and the input/output count of each JOB for the execution record for the JOBs; and comparing the input/output time for the input/output operation when the error occurs with the input/output time for a normal input/output when no error occurs, and considering the JOB, whose input/output time for the input/output operation does not accord, as the cause of the error among all of the executed JOBs.

15. An error recovery support process that can be executed in a recovery routine executed in one of a plurality of CPUs in a computer system, comprising:

executing a plurality of JOBs of a JOB group multiple times and storing an execution record for each JOB executed;

comparing the execution record of the JOB group when an error occurs with a regular execution record of the JOB group, the regular execution record being the execution record when the JOB group was executed normally;

detecting the cause of the error from said comparing;

storing an end code as the execution record for each execution of a JOB;

wherein said comparing compares the end code when the error occurs with the end code when no error occurs for JOBs of the JOB group and said detecting detects a JOB having a different end code as the cause of the error;

storing an execution time of each JOB as the execution record for the JOB;

wherein said comparing compares the execution time when the error occurs with the execution time when no error occurs for JOBs of the JOB group; and wherein said detecting detects a JOB, whose execution time is out of a fixed minimum and maximum value of the execution time when no error occurs, as the cause of the error; and wherein said comparing compares the execution record when no error occurs with the execution record when the error occurs for a preceding JOB which decides a condition to execute the JOB having the error, and detects the JOB, whose execution record does not accord, as the cause of the error.

16. A computer system, comprising:

a plurality of CPUs;

a bus connecting said plurality of CPUs;

a JOB group comprising a plurality of JOBs;

a JOB execution control unit for controlling executions including parallel execution of the JOBc within said JOB group by said plurality of CPUs;

an input/output count acquisition unit obtaining an input/output count from execution of each of the JOBs;

an event generation unit generating a JOB start, a JOB end and a close-event from execution of each of said JOBs; and a storage storing JOB execution results based upon the JOB start, JOB end, and close-event for each of said JOBs that is executed.

17. The computer system of claim 16, further comprising:

an error recovery support process;

a CPU assigned to run said error recovery process;

in response to an error occurring during execution of the JOBs of said JOB group, said error recovery support process determining one JOB from among said JOBs of said JOB group whose execution caused the error and instructing the JOB execution control unit to re-execute said one JOB of said JOB group, with said determining being based upon a comparison of said execution results for at least some of said JOBs of said JOB group that was executed and resulted in the error with corresponding normal execution results.

18. The computer system of claim 16, further comprising:

a JOB flow definition information for each of said JOBs defining sequential and parallel flow of execution of said JOBs and file input/output flow during execution of said JOBs;

a CPU assigned to run said error recovery process;

in response to an error occurring during execution of the JOBs of said JOB group, said error recovery support process determining one JOB from among said JOBs of said JOB group whose execution caused the error and instructing said JOB execution control unit to re-execute said one JOB and others of said JOBs whose execution was affected by the error and to continue execution of any remaining unexecuted JOBs of said JOB group, with said determining being based upon a comparison of said execution results for at least some of said JOBs of said JOB group that was executed and resulted in the error with corresponding normal execution results and being based upon said JOB flow information.

19. The computer system of claim 18, wherein:

said CPU assigned to run said error recovery routine is a personal computer and is different from the CPU's that execute the job group.

20. The computer system according to claim 16, wherein said JOB execution control unit executes the JOB group multiple times and stores normal execution results when no error occurs; and further including an error recovery process that compares the execution results of the JOB group when the error occurs with the normal execution results, and detects the cause of the error due to such a comparison.

21. The computer system according to claim 16, wherein the execution results include an end code for each JOB.

22. The computer system according to claim 16, wherein the execution results include the input/output count for each JOB.

23. The computer system according to claim 16, wherein the execution results include an execution time for each JOB.

24. The computer system according to claim 23, wherein the execution results include an end code for each JOB.

25. The computer system according to claim 23, wherein the execution results include the input/output count for each JOB.

26. The computer system according to claim 25, wherein the execution results include an end code.

27. A method of executing a JOB group, having a plurality of JOBs in a computer system having a plurality of CPUs, comprising:

controlling an order of executions of the plurality of JOBs within the JOB group;

generating events from the execution of each of the JOBs and generating an input/output count for each JOB during the executions of the JOBs;

storing JOB execution results based upon the events and the input/output count for each of the JOBs that is executed;

transferring the JOB execution result, information of a JOB command language, and a JOB flow definition information into an error recovery process; and determining, with the error recovery process, one JOB from among the JOBs of the JOB group whose execution caused the error and instructing the computer system to re-execute the one JOB of the JOB group based upon comparing the execution results with normal execution results.

28. The method according to claim 27, wherein said controlling controls sequential and/or parallel executions of the plurality of JOBs in the computer system.

29. The method according to claim 27, wherein said generating generates the events as a JOB start, a JOB end, and a close-event from execution of each of the JOBs.

30. The method according to claim 27, wherein said storing accumulates an end code of each JOB as an execution record for the JOB for each execution of a JOB.

31. The method according to claim 27, wherein said storing accumulates the input/output count of the JOB as an execution record for the JOB.

32. The method according to claim 27, wherein said storing accumulates an execution time of the JOB as an execution record for the JOB.

33. The method according to claim 27, wherein said transferring transfers an end code of each JOB as an execution record, said input/output count of the JOB as an execution record, an execution time of the JOB as an execution record, information of a JOB control language, a JOB definition, and a preceding JOB definition into the error recovery process.

34. The method according to claim 33, wherein the error recovery process includes the steps of:

receiving an execution start event, an execution end event, and close-event from said step of transferring;

setting the execution start time, the execution end time, and the input/output count into an execution record;

said determining including comparing the execution record of the JOB group when the error occurs with the execution record obtained at a normal end; and said determining including detecting the one JOB that caused the error from said comparing.

35. The method according to claim 27, wherein said instructing instructs the computer system to re-execute the one JOB of the JOB group and a reallocation of a file.

36. A computer system having a plurality of CPUs in executing a JOB group, having a plurality of JOBs, comprising:

means for controlling an order of executions of the plurality of JOBs within the JOB group;

means for generating events from the execution of each of the JOBs and generating an input/output count for each JOB during the executions of the JOBs;

means for storing JOB execution results based upon the events and the input/output count for each of the JOBs that is executed;

means for transferring the JOB execution result, information of a JOB command language, and a JOB flow definition information into an error recovery process; and means for determining, with the error recovery process, one JOB from among the JOBs of the JOB group whose execution caused the error and instructing the computer system to re-execute the one JOB of the JOB group based upon comparing the execution results with normal execution results.

37. The computer system according to claim 36, wherein said controlling means controls sequential and/or parallel executions of the plurality of JOBs in the computer system.

38. The computer system according to claim 36, wherein said generating means generates the events as a JOB start, a JOB end, and a close-event from execution of each of the JOBs.

39. The computer system according to claim 36, wherein said storing means accumulates an end code of each JOB as an execution record for the JOB for each execution of a JOB.

40. The computer system according to claim 36, wherein said storing means accumulates the input/output count of the JOB as an execution record for the JOB.

41. The computer system according to claim 36, wherein said storing means accumulates an execution time of the JOB as an execution record for the JOB.

42. The computer system according to claim 36, wherein said transferring means transfers an end code of each JOB as an execution record, said input/output count of the JOB as an execution record, an execution time of the JOB as an execution record, information of a JOB control language, a JOB definition, and a preceding JOB definition into the error recovery process.

43. The computer system according to claim 42, further including:

means for receiving an execution start event, an execution end event, and close-event from said transferring means;

means for setting the execution start time, the execution end time, and the input/output count into an execution record;

means for said determining including comparing the execution record of the JOB group when the error occurs with the execution record obtained at a normal end; and means for said determining including detecting the one JOB that caused the error from said comparing.

44. The computer system according to claim 36, wherein said instructing means instructs the computer system to re-execute the one JOB of the JOB group and a reallocation of a file.

* * * * *